United States Patent [19]

Ichihara

[11] Patent Number: 5,151,836
[45] Date of Patent: Sep. 29, 1992

[54] DISK CHUCKING DEVICE
[75] Inventor: Akira Ichihara, Furukawa, Japan
[73] Assignee: Alps Electric Co., Ltd., Tokyo, Japan
[21] Appl. No.: 672,813
[22] Filed: Mar. 21, 1991
[30] Foreign Application Priority Data May 31, 1990 [JP] Japan .................. 2-56579[U]

[51] Int. Cl.⁵ .......................................... G11B 17/022
[52] U.S. Cl. .............................. 360/99.08; 360/99.05; 360/99.12
[58] Field of Search .................. 360/99.08, 133, 99.05, 360/99.12

[56] References Cited

U.S. PATENT DOCUMENTS

| 4,825,314 | 4/1989 | Maekawa et al. | 360/133 |
| 4,989,107 | 1/1991 | Tsukahara | 360/99.08 |
| 5,010,427 | 4/1991 | Taguchi et al. | 360/99.08 X |

FOREIGN PATENT DOCUMENTS 61-73263  4/1986  Japan .

*Primary Examiner*—John H. Wolff
*Attorney, Agent, or Firm*—Guy W. Shoup; B. Noel Kivlin

[57] ABSTRACT

A chucking device, in which a 3½" flexible disk is centered and driven so as to rotate, is improved. A driving pin is disposed on one end of a plate spring and the other end portion is elastically energized to be brought into contact with a plurality of holding pins disposed on a turn table so as to protrude therefrom. At the chucking, since the plate spring is separated from the holding pins, sliding resistance, wear, etc. are not produced. For this reason, even if the chucking is repeated over many years, a high centering precision can be sustained.

1 Claim, 4 Drawing Sheets

DISK CHUCKING DEVICE

FIELD OF THE INVENTION

The present invention relates to a disk chucking device used in a disk driving device, which drives an information recording disk so as to rotate by chucking it, in order to record/reproduce the information, and in particular to a disk chucking device suitable for chucking a floppy disk, so-called 3.5 inch diameter floppy disk.

BACKGROUND OF THE INVENTION

For a disk driving device driving an information recording medium (hereinbelow called simply a disk) formed in a disk shape, various improvements and contrivances have been proposed in order to deal with trials to increase the recording density and to reduce the size and the weight. In one of them a turn table is mounted on a spindle shaft by inserting the latter in the former and recording/reproduction is effected by chucking a disk through a driving pin protruding from the disk mounting surface of the turn table and a chucking magnet to drive it so as to rotate.

FIG. 7 shows an example of the disk 1 having a metallic hub. A disk 1 of this kind, on the surface of which a magnetic recording layer is formed, is accommodated in a hard case 2a to form a disk cartridge 2. A metallic hub 3 formed by a thin plate made of magnetic metal is secured to the central portion of the disk. An approximately quadratic chucking hole 4, in which the extremity portion of the spindle shaft is inserted, is formed in the central portion of this metallic hub 3 and an approximately rectangular positioning hole 5, in which the extremity portion of the driving pin is inserted to be engaged therewith, is formed in the peripheral portion. The disk cartridge 2 of this type is known generally as a 3.5 inch floppy disk cartridge.

Such a disk cartridge 2 rotates the disk 1 by chucking it by means of a disk chucking device of the disk driving device. In this disk chucking device, e.g. a rotating driving shaft, which is the driving shaft of a driving motor, is disposed at the center of the turn table so as to protrude therefrom and the driving pin is disposed, deviated from the center. Further, a yoke plate is mounted on the turn table through a bearing member of the rotating driving shaft and a magnet plate is secured to this yoke plate.

Now, the state, where the rotating driving shaft and the driving pin are engaged with the chucking hole 4 and the positioning hole 5 of the disk 1, respectively, will be explained. When the disk cartridge 2 is mounted on the turn table, the rotating driving shaft is engaged with the chucking hole 4. At this time, when the turn table is rotated, the driving pin is inserted in the positioning hole 5 to be engaged therewith. Then the driving pin is pushed by the front side of the positioning hole 5 in the rotational direction by the load torque applied to the disk 1. The driving pin is displaced in the direction, where it becomes gradually more distant from the rotating driving shaft of the turn table, while being moved backward in the rotational direction of the turn table against a spring and the driving pin is strongly pushed to the side of the positioning hole 5, which is closer to the periphery, by the displacement force. As the result, the metallic hub 3 is energized to be displaced in the direction where it becomes more distant from the rotating driving shaft of the turn table and the center of the disk 1 is positioned at the center of the turn table. In this way the metallic hub 3 is linked with the turn table in one body through the driving pin so that the disk 1 is driven so as to rotate together with the turn table.

However, in the device described above, since the driving pin is only pivoted around a fulcrum pin of a ring plate, if there are errors in the size between the chucking hole 4 and the positioning hole 5 disposed in the metallic hub 3 of the disk 1, the driving pin pushes no more a fixed position on the side of the positioning hole 5, which is closer to the periphery. Further deviations in the position, where the driving pin pushes the positioning hole 5, take place due to errors in the mounting of the driving pin or errors in the size of the ring plate. As the result, in the case where the index signal of the disk 1 is detected by detecting the rotational phase on the turn table side, positional deviations take place and therefore it is feared that the index cannot be detected precisely.

In order to solve the problem described above, a technique disclosed in JP-P-61-73263A has been proposed. This technique is shown in FIGS. 5 and 6.

As indicated in these figures, there are disposed a rotating driving shaft 6, which constitutes the output shaft of a driving motor not shown in the figure and at the same time the extremity of which is engaged with the central hole (chucking hole) formed in the central disk (metallic hub) secured to the center of the disk 1, and a driving pin 7, which is engaged with a driving pin engaging hole (positioning hole) formed at a position deviated from the center of the central disk 3.

A rotor 9, on the inner peripheral surface of which a ring-shaped magnet 8 constituting the driving motor is mounted, is mounted on the rotating driving shaft 6 described above through a bearing member 10. A ring plate 11 is mounted on the extremity side of the rotating driving shaft 6 through the bearing member 10 described above, located on the rotor 9. Similarly a rotating lever mounting plate 12 is mounted on this ring plate 11 through the bearing member 10. Further a magnet plate 13 attracting the central disk 3 of the disk 1 is secured to this rotating lever mounting plate 12.

Furthermore a rotating lever 14 formed in an approximately semicircular shape, curved so as to surround the outer periphery of the rotating driving shaft 6, is mounted between the ring plate 11 and the rotating lever mounting plate 12. The driving pin 7 is planted on one end of this rotating lever 14 and an elongated hole 15, whose major diameter is in the radial direction, is formed on the base end side thereof. On the other hand, a pivot pin 18 is planted on the lower surface of the rotating lever mounting plate 12, which pin 18 is inserted in through holes 16 and 17 formed in the ring plate 11 and the rotor 9, respectively, and the extremity of which pin protrudes from the lower surface of the rotor 9. The rotating lever 14 is mounted by inserting the pivot pin 18 in the elongated hole 15 described above so that it is freely supported by this pivot pin 18 and by engaging the driving pin 7 on the extremity side with the positioning hole 19 formed in the rotating lever mounting plate 12 so as to protrude therefrom. This positioning hole 19 is formed in an approximately sector shape so as to be narrower on the inner periphery side. Further a coil spring 20 serving as energizing means is extended between an engaging piece disposed on the base end edge so as to protrude therefrom and another engaging piece standing on the middle portion of the rotating lever mounting plate. The rotating lever 14 described above is energized so as to rotate in the direction indicated by an arrow A in FIG. 6 and pushes the driving pin 7 to one side 19a of the positioning hole 19, which is the front side in the rotational direction of the rotor 9. In this way, since the rotating lever 14 is energized to be rotated and the driving pin 7 is pushed to one side of the positioning pin 19, the positioning of the driving pin 7 is effected.

In such a prior art example, when there are errors in the size between the central hole 4 in the central disk 3 of the disk 1 and the driving pin engaging hole 5, and the disk 1 is positioned, while pushing two sides of the central hole 4 to the side surface of the rotating driving shaft 6, in the case where the driving pin 7 is not positioned at the corner portion formed by the side, which is on the outer periphery side, and the front side in the rotational direction, but it is engaged with the middle portion of the side, which is on the outer periphery side, the position of the pivot pin 18 is varied by moving appropriately the rotating lever in an extent of the elongated hole 15. Then, the driving pin 7 is moved within the driving pin engaging hole 5 so that the engaging position of the driving pin 5 with the driving pin engaging hole 15 is kept always constant.

Now, according to the prior art technique described above, the elongated hole 15 formed in the rotating lever 14 is freely supported on the mounting plate by the pivot pin 18 and the position of the pivot pin 18 is varied by moving appropriately the rotating lever 14 in the extent of the elongated hole 15.

However, at this varying operation, since the pivot pin 18 is slid on the contour of the elongated hole 15 while being thrust thereto by a coil spring 20, torque loss is produced. In addition, since loss was great, if burrs remained after cutting, fabrication cost was increased. Further, it was feared that disarrangements in the size are produced because of wear by sliding and that powder produced by wear has bad influences on the recording/writing of recorded data.

OBJECT OF THE INVENTION

The present invention has been done in view of the problems of the prior art described above and the object thereof is to provide a chucking device capable of improving the centering precision for a flexible disk and sustaining the high-precision, even if the chucking operation is repeated over many years.

SUMMARY OF THE INVENTION

In order to achieve the above object, a disk chucking device according to the present invention comprises a driving shaft engaged with a central hole formed in an information recording disk; a turn table mounted on this driving shaft so as to rotate together with the driving shaft in one body; a plurality of holding pins disposed on the turn table so as to protrude therefrom; a plate spring, whose one side edge side of one end portion is brought into contact with these holding pins, a driving pin engaged with a driving pin engaging hole formed at a position deviated from the center of the information recording disk being disposed on the other end portion thereof; and elastic energizing means for elastically energizing the one end portion of the plate spring towards the holding pins stated above.

In order to achieve the object described above, the other end portion of the plate spring, on one end portion of which the driving pin is disposed so as to protrude therefrom, is brought into contact with the plurality of holding pins disposed on the turn table so as to protrude therefrom by elastically energizing it. Since the plate spring is separated from the holding pins at the chucking, sliding resistance, wear, etc. are not produced.

Owing to the means described above, even if there are errors in the size of the positioning hole formed in the metallic hub of the disk, since the driving pin is displaced by the fact that the plate spring is moved against the elastic means so that the errors in the size described above are absorbed, it is possible to load the disk always at a fixed position.

Further, at the displacement described above, since the plate spring is separated from the holding pins, neither sliding resistance nor wear at the movement is produced. Therefore it is possible to prevent torque loss and to improve the durability.

DESCRIPTION OF THE DRAWINGS

FIG. 7 being a bottom view of a disk cartridge.

DETAILED DESCRIPTION

Figure 1A:
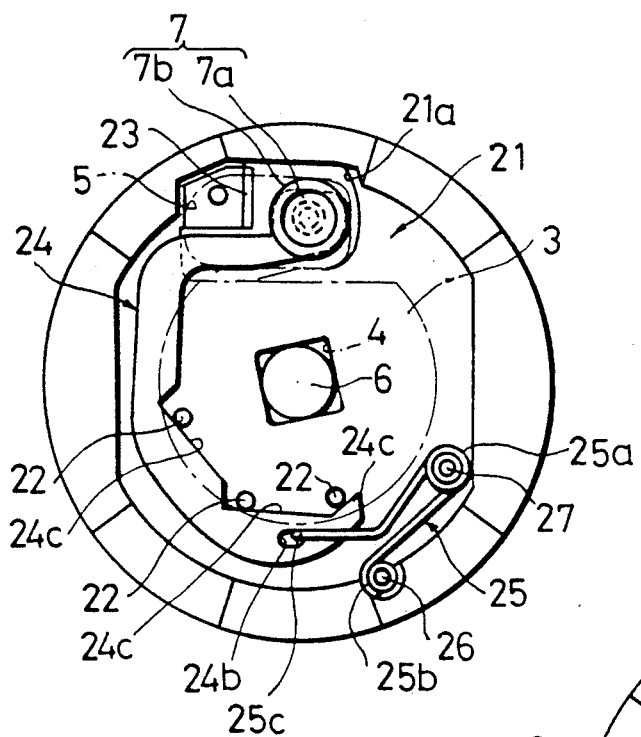
FIGS. 1A, 1B and 1C are schemes for explaining the disk chucking device according to the present invention at the beginning, in the course and at the termination of the chucking, respectively.

Hereinbelow an embodiment of the present invention will be explained, referring to the drawings. The constituent elements, which are identical or can be considered as identical to those used in the prior art examples described previously are referred to by same reference numerals and overlapping explanation will be omitted suitably.

Figure 1B:
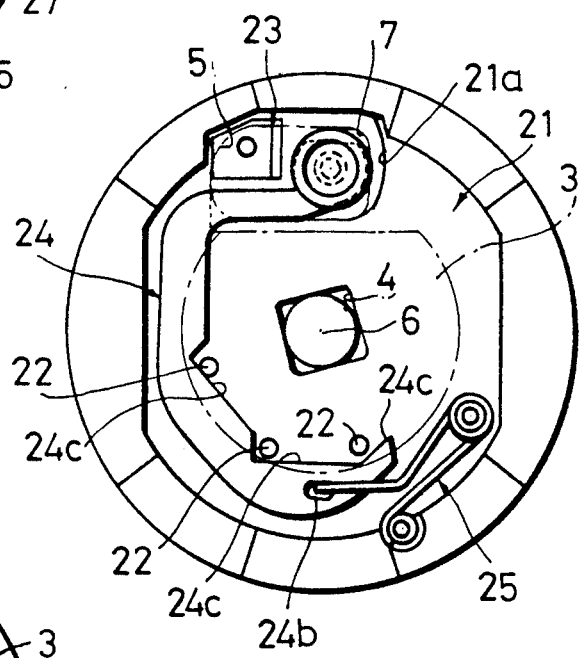
Figure 1C:
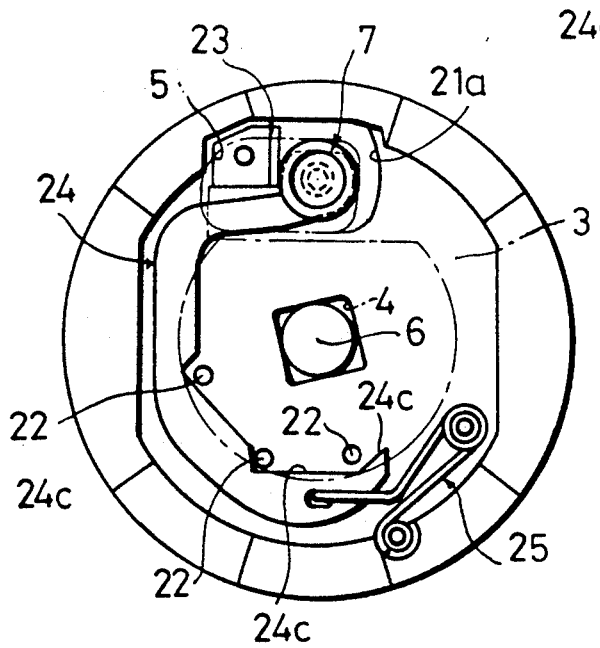
Figure 2:
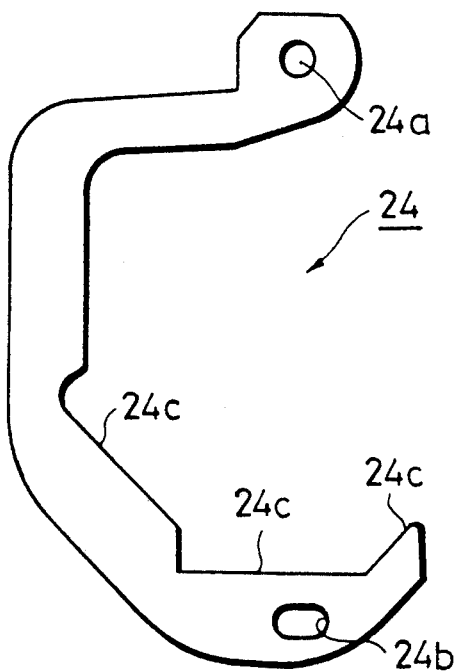
FIG. 2 is a plan view of the plate spring.
Figure 4:
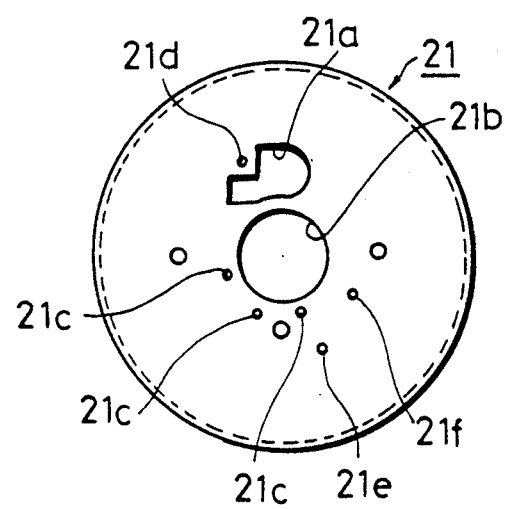
FIG. 4 is a plan view of the rotor.
Figure 3A:
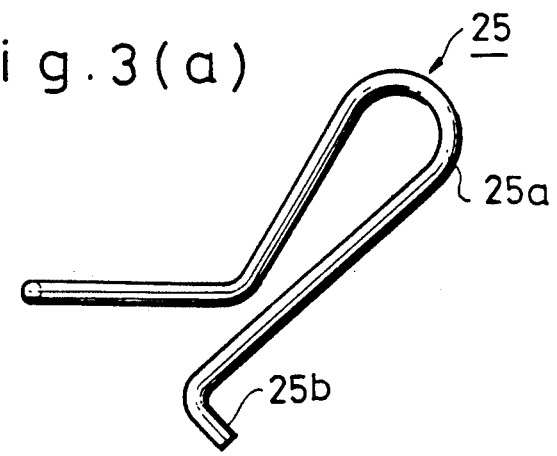
FIG. 3A and 3B are a plan view and a front view of the spring coil, respectively.
Figure 3B:
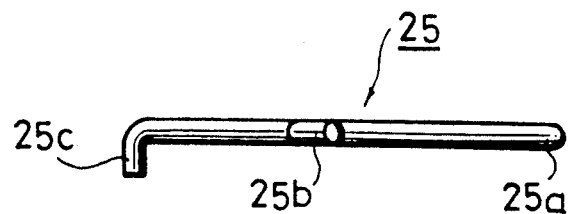
Figure 5:
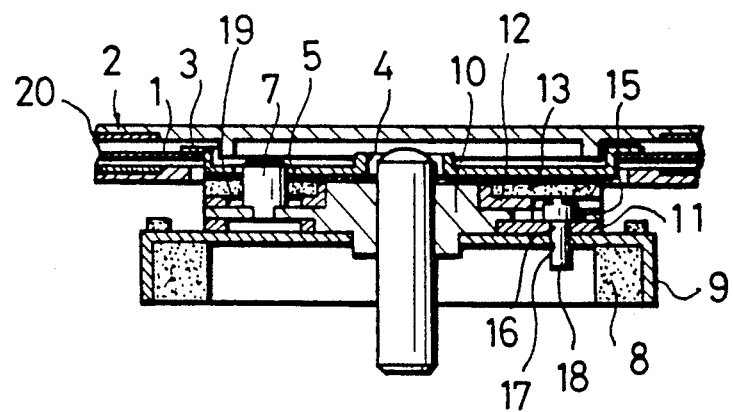
FIGS. 5 to 7 are schemes for explaining the prior art examples, FIGS. 5 and 6 being a longitudinal cross-sectional view and a plan view, respectively.
Figure 6:
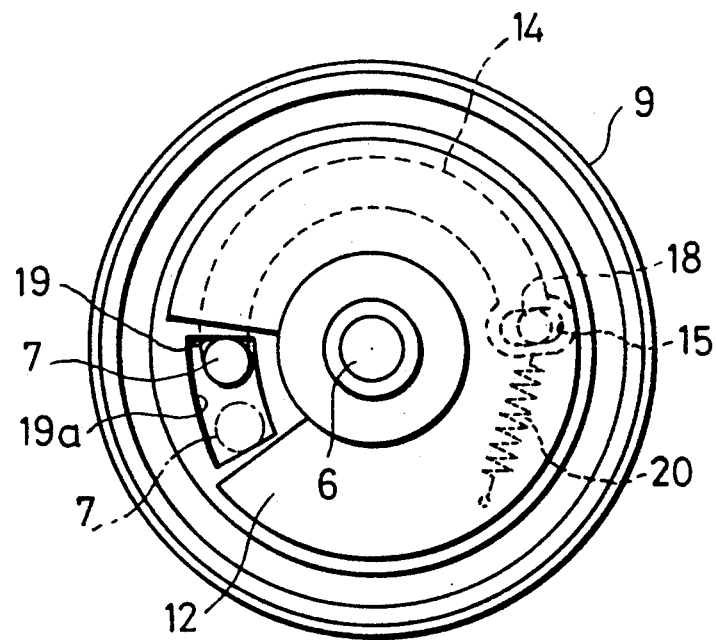
Figure 7:
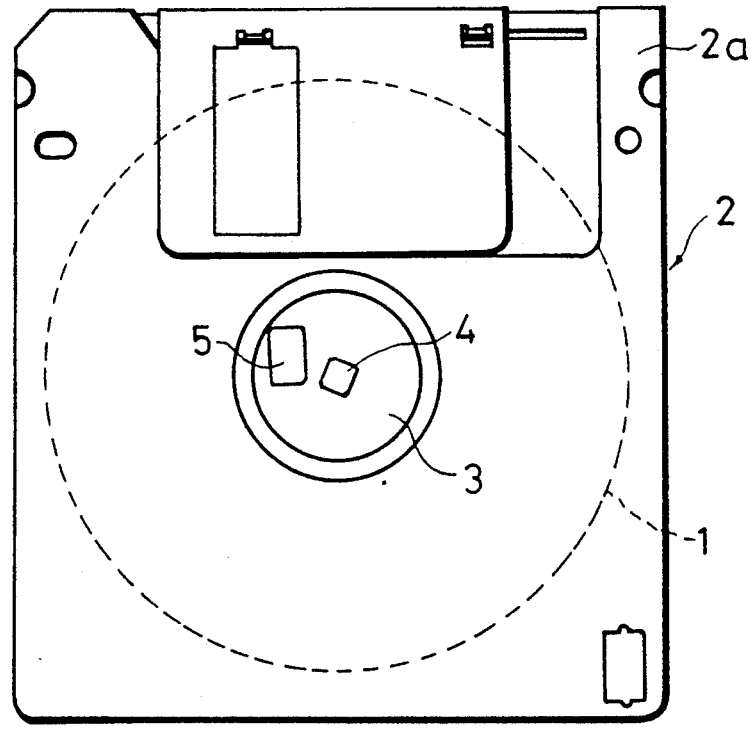

FIGS. 1A, 1B and 1C are schemes for explaining the disk chucking device according to the present invention at the beginning, in the course and the termination of the chucking, respectively; FIG. 2 is a plan view of the plate spring; FIGS. 3A and 3B are a plan view and a front view of the spring coil, respectively; and FIG. 4 is a plan view of the rotor.

In these figures, the disk chucking device includes the driving shaft (spindle shaft) 6, which constitutes the output shaft of a driving motor not shown in the figure and the extremity of which is engaged with the chucking hole 4 formed in the metallic hub 3 secured to the center of the disk 1, and the driving pin 7 engaged with the positioning hole 5 formed at a position deviated from the center of the metallic hub 3 described above.

A rotor 21, on the inner peripheral surface of which a ring-shaped magnet 8 constituting the driving motor is disposed, is mounted on the spindle shaft 6 described above by fitting with pressure, welding, etc. This rotor 21 constitutes the turn table and as indicated in FIG. 4, the rotor 21 is provided with an opening 21a, through which the driving pin 7 can get away downward, when it is pushed by the metallic hub 3; a round hole 21b formed at the center; 3 mounting holes 21c, 21c, 21c, in which holding pins 22, 22, 22 holding a plate spring stated later are planted; a mounting hole 21d, at which a stopper piece 23, which is brought into contact with the driving pin 7 to position it at the termination of the chucking, is mounted; and a mounting hole 21e, at which an engaging pin 26, which is engaged with an end portion of a coil spring stated later, is mounted. The holding pins 22, . . . . . . are so arranged that they are at the apices of a triangle and that they can hold stably the plate spring at non-chucking.

This plate spring 24 is composed of an approximately semicircular arc-shaped elastic plate, as indicated in FIG. 2. A mounting hole 24a, at which the driving pin 7 is mounted, is formed in one end portion thereof and on the other hand an elongated hole 24b, in which one end of a coil spring 25 stated later is inserted to be engaged therewith, is formed in the other end portion thereof. Further contacting portions 24c, 24c, 24c, with which the holding pins 22, 22, 22 are brought into contact, respectively, are formed on the inner side portion close to the other end portion.

As indicated in FIGS. 3A and 3B, the coil spring 25 consists of a coil portion 25a; one end portion 25b extended from the coil portion 25a and engaged with the engaging pin 26 of the rotor 21; and the other end portion 25c extended from the coil portion 25a and inserted in the elongated hole 24b formed in the plate spring 24 to be engaged therewith. Consequently, the other end portion of the plate spring 24 is energized by the coil spring 25 towards the holding pins 22, 22, 22 and the contacting portions 24c, 24c, 24c are contacted with pressure to the holding pins 22, 22, 22 so that the plate spring 24 is positioned and held there.

27 is a supporting pin, which supports the coil portion 25a of the coil spring 25 and which is mounted at a mounting hole 21f in the rotor 21. Further, in the present embodiment, the driving pin 7 is composed of a roller shaft 7a and a roller 7b.

The other parts, which are not specifically explained, are constituted in the same manner as those used in the prior art example described previously.

Next the operation of the chucking device constituted as described above will be explained.

When the disk cartridge 2 is located on the turn table, the metallic hub 3 of the disk 1 is attracted to the turn table by a chucking magnet. In this way, the extremity portion of the spindle shaft 6 is inserted in the chucking hole 4 of this metallic hub 3. At this time, the driving pin 7 is pushed in the opening 21a formed in the rotor 21 by the lower surface of the metallic hub 3 while bending the plate spring 24.

In this state, the rotor 21 is rotated clockwise in FIG. 1A. When the driving pin 7 and the positioning hole 6 in the metallic hub 3 are in accordance with each other, as indicated in FIG. 1a, the driving pin 7 is inserted in the positioning hole 5 by the elastic force of the plate spring 24. In this state indicated in FIG. 1A, at non-loading of the disk cartridge 2, the plate spring 24 is energized by the coil spring 25 so that the contacting portions 24c, . . . . . are contacted with pressure with the holding pins 22, . . . . . . , which are positioned to be held there.

When the rotor 21 is further rotated, since the driving pin 7 is energized by the coil spring 25 through the plate spring 24, it is brought into contact with the inner edge of the positioning hole 5 on the outer periphery side and the right end side. The metallic hub 3 is pushed to be moved outward in the radial direction of the rotor 21 (towards the outer periphery) by the fact that the rotor 21 is rotated together with the driving pin 7 remaining in contact therewith. Accompanied thereby, the spindle shaft 6 is thrust to the corner of the chucking hole 4, which is the most distant from the positioning hole 5. Accompanied by this operation, as indicated in FIG. 1B, the driving pin 7 is pushed to the left by the inner edge on the outer periphery side and on the right end side of the positioning hole 5 formed in the metallic hub 3 against the coil spring 25. Then, the plate spring 24, to which the driving pin 7 is secured, is displaced counterclockwise towards the outer periphery against the coil spring 25 and the contacting portions 24c, . . . . . . are separated from the holding pins 22, . . . . . . . That is, the displacement of the plate spring 24 is effected without sliding with respect to the holding pins 22, . . . . . . and in this way it is possible to prevent torque loss, friction, etc.

When the rotor 21 is rotated further from the state indicated in FIG. 1B, the driving pin 7, which is pushed to the left by the inner edge on the outer periphery side and on the right end side of the positioning hole 5 formed in the metallic hub 3, is brought close to the stopper piece 23 and brought into contact with the stopper piece 23, as indicated in FIG. 1C. The positioning of the driving pin 7 is effected in this way.

Consequently, in the embodiment described above, in the case where there are errors in the size between the chucking hole 4 and the positioning hole 5 in the metallic hub 3 of the disk 1 and at the chucking the driving pin 7 is engaged with the middle portion of the side on the outer periphery side of the positioning hole 5, the plate spring 24 is made variable by moving against the coil spring 25 so that the engaging position thereof with the driving pin 7 and the positioning hole 5 can be kept constant.

Although, in the above embodiment, the holding pins 22, . . . . . . are arranged on the inner surface side of the plate spring 24 and energized by the coil spring 25, the present invention is not restricted thereto, but the holding pins 22, . . . . . . may be arranged on the outer surface side of the plate spring 24 and energized by the coil spring.

As explained above, according to the present invention, it is possible to provide a disk chucking device, in which the plate spring can be moved without sliding; deviations of the disk loading position produced by errors in the size, etc. are eliminated; the disk loading can be effected with precise positioning; and further the durability can be improved.

What is claimed is:

1. A disk chucking device comprising:
   a driving shaft engaged with a central hole formed in an information recording disk;
   a turn table mounted on said driving shaft so as to rotate together with said driving shaft;
   a plurality of holding pins disposed on said turn table and protruding therefrom;
   a plate spring, comprising of a first and a second end portions, wherein a side edge of the first end portion is brought into contact with said holding pins, a driving pin engaged with a driving pin engaging hole formed at a position deviated from a center of the said information recording disk, said driving pin being disposed on the second end portion of said plate spring; and
   elastic energizing means for elastically energizing the first end portion of said plate spring towards said holding pins.

* * * * *